(12) United States Patent
Janka et al.

(10) Patent No.: US 10,760,997 B2
(45) Date of Patent: Sep. 1, 2020

(54) APPARATUS AND PROCESS FOR MEASURING CHARACTERISTICS OF PARTICLE FLOW

(71) Applicant: Pegasor Oy, Tampere (FI)

(72) Inventors: Kauko Janka, Tampere (FI); Erkka Saukko, Tampere (FI)

(73) Assignee: PEGASOR OY, Tampere (FI)

( * ) Notice: Subject to any disclaimer, the term of this patent is extended or adjusted under 35 U.S.C. 154(b) by 149 days.

(21) Appl. No.: 15/772,765

(22) PCT Filed: Nov. 2, 2016

(86) PCT No.: PCT/FI2016/050772
§ 371 (c)(1),
(2) Date: May 1, 2018

(87) PCT Pub. No.: WO2017/077190
PCT Pub. Date: May 11, 2017

(65) Prior Publication Data
US 2018/0238777 A1    Aug. 23, 2018

(30) Foreign Application Priority Data

Nov. 2, 2015   (FI) .................................... 20155783

(51) Int. Cl.
*G01N 1/22* (2006.01)
*G01N 15/06* (2006.01)
(Continued)

(52) U.S. Cl.
CPC ............. *G01N 1/2247* (2013.01); *B03C 3/68* (2013.01); *G01N 15/0656* (2013.01);
(Continued)

(58) Field of Classification Search
CPC ... B03C 3/68; B03C 2201/24; B03C 2201/30; G01N 1/22; G01N 1/2247; G01N 1/2252;
(Continued)

(56) References Cited

U.S. PATENT DOCUMENTS 3,449,667 A * 6/1969 Gourdine ................ G01N 27/70
                                                    324/71.1
3,526,828 A * 9/1970 Whitby .............. G01N 15/0656
                                                    324/464
(Continued)

FOREIGN PATENT DOCUMENTS

DE     202014007548     12/2014
EP     2853882          4/2015
(Continued)

OTHER PUBLICATIONS

William C. Hinds, Aerosol Technology—Properties, Behavior, and Measurement of Airborne Particles, 2nd edition, Jonhn Wiley & Sons, Jan. 19, 1999, pp. 408-412.
(Continued)

*Primary Examiner* — Nguyen Q. Ha
(74) *Attorney, Agent, or Firm* — Leason Ellis LLP

(57) ABSTRACT

The present invention relates to an apparatus (1) and process for measuring characteristics of a particle flow. The measuring is done with two different cut-off diameters of a particle trap (13) of which one cut-off diameter is adjusted based on the measured particle characteristics.

20 Claims, 5 Drawing Sheets

(51) Int. Cl.
*G01N 27/70* (2006.01)
*B03C 3/68* (2006.01)
*G01N 15/00* (2006.01)

(52) U.S. Cl.
CPC ...... *B03C 2201/24* (2013.01); *B03C 2201/30* (2013.01); *G01N 1/2252* (2013.01); *G01N 27/70* (2013.01); *G01N 2001/227* (2013.01); *G01N 2001/2223* (2013.01); *G01N 2015/0046* (2013.01)

(58) Field of Classification Search
CPC .... G01N 15/06; G01N 15/0656; G01N 27/70; G01N 2001/227; G01N 2001/2223; G01N 2015/0046
See application file for complete search history.

(56) References Cited

U.S. PATENT DOCUMENTS

| | | | |
|---|---|---|---|
| 7,812,306 B2 | 10/2010 | Fissan et al. | |
| 8,122,711 B2 | 2/2012 | Schmidt et al. | |
| 8,666,679 B2* | 3/2014 | Barrett | G01N 15/0266 702/24 |
| 10,453,668 B2* | 10/2019 | Continetti | H01J 49/165 |
| 2004/0151672 A1* | 8/2004 | Yoshida | G01N 15/0656 424/46 |
| 2007/0056395 A1* | 3/2007 | Bae | G01N 15/0656 73/865.5 |
| 2010/0072391 A1* | 3/2010 | Hopwood | G01N 15/0656 250/397 |
| 2011/0050243 A1* | 3/2011 | Tikkanen | G01N 1/2252 324/464 |
| 2014/0069169 A1* | 3/2014 | Janka | G01N 1/2252 73/28.02 |
| 2015/0102822 A1* | 4/2015 | Okuda | G01N 27/62 324/464 |
| 2015/0192508 A1* | 7/2015 | Janka | G01N 15/0656 250/282 |

FOREIGN PATENT DOCUMENTS

| | | |
|---|---|---|
| WO | WO 2004/027394 | 4/2004 |
| WO | WO 2004/113904 | 12/2004 |
| WO | WO 2006/127803 | 11/2006 |
| WO | WO 2009/109688 | 9/2009 |
| WO | WO 2010/049870 | 5/2010 |
| WO | WO 2012/022842 | 2/2012 |
| WO | WO 2013/121095 | 8/2013 |
| WO | WO 2013/132154 | 9/2013 |

OTHER PUBLICATIONS

Maricq and Wu, The effective density and fractal dimensions of soot particles from premixed flames and motor vehicle exhaust, Aerosol Science 35 (May 11, 2004), pp. 1251-1274.

* cited by examiner

APPARATUS AND PROCESS FOR MEASURING CHARACTERISTICS OF PARTICLE FLOW

CROSS-REFERENCE TO RELATED PATENT APPLICATIONS

This application is a U.S. National Phase Application under 35 U.S.C. § 371 of International Patent Application No. PCT/FI2016/050772, filed Nov. 2, 2016, which claims the priority of Finnish Application No. 20155783, filed Nov. 2, 2015, which is incorporated by reference as if expressly set forth in its entirety herein.

FIELD OF INVENTION

The present invention relates to a process for measuring characteristics of a particle flow according to the preamble of claim 1. The present invention further relates to an apparatus, i.e. a sensor, for measuring characteristics of a particle flow according to the preamble of claim 9 and specifically to an apparatus allowing the removal of ultrafine particles from the particle stream.

BACKGROUND OF THE INVENTION

There is a constant increase in the demand for real-time particle control. Especially the real-time exhaust control of combustion engines, such as vehicles, requires reliable and non-expensive particle monitoring. Requirement for particle control exists also e.g. in indoor air quality and outdoor monitoring or with air traffic safety. The particle amount is in most cases expressed as particle mass concentration, in $mg/m^3$ or equivalent.

Various particle measurement devices are based on electrically charging particles and measuring the electrical current carried by such charged particles. One such prior art method and apparatus for measuring fine particles is described in document WO2009109688 A1, Pegasor Oy, Nov. 11, 2009. In this prior art method clean, essentially particle free, gas is supplied into the apparatus and directed as a main flow via an inlet chamber to an ejector provided inside the apparatus. The clean gas is further ionized before and during supplying it into the inlet chamber. The ionized clean gas may be preferably fed to the ejector at a sonic or close to sonic speed. The ionizing of the clean gas may be carried out for example using a corona charger. The inlet chamber is further provided with a sample inlet arranged in fluid communication with a channel or a space comprising aerosol having fine particles. The clean gas flow and the ejector together cause suction to the sample inlet such that a sample aerosol flow is formed from the duct or the space to the inlet chamber. The sample aerosol flow is thus provided as a side flow to the ejector. The ionized clean gas charges the particles. The charged particles may be further conducted back to the duct or space containing the aerosol. The fine particles of the aerosol sample are thus monitored by monitoring the electrical charge carried by the electrically charged particles. Free ions may further be removed using an ion trap.

A major problem in any particle measurement device which is based on electrically charging particles and measuring the electrical current carried by such charged particles is the conversion of the measured electrical current to actual characteristics of the particle flow, such as particle count, surface area or mass concentration. The conversion factor may be simply determined by calibrating a particle measurement device against a reference method. For example mass concentration is typically calibrated against gravimetric method, which accurately determines mass concentration. However, such calibration may change due to changes in the shape of particle size distribution curve, mean particle diameter, width of a lognormal particle size distribution curve, particle shape (usually expresses with fractal parameters) or particle density.

U.S. Pat. No. 7,812,306 B2, TSI, Incorporated, Oct. 12, 2010, describes an instrument for non-invasively measuring nanoparticle exposure includes a corona discharge element generating ions to effect unipolar diffusion charging of an aerosol, followed by an ion trap for removing excess ions and a portion of the charged particles with electrical mobilities above a threshold. Downstream, an electrically conductive HEPA filter or other collecting element accumulates the charged particles and provides the resultant current to an electrometer amplifier. The instrument is tunable to alter the electrometer amplifier output toward closer correspondence with a selected function describing particle behavior, e.g. nanoparticle deposition in a selected region of the respiratory system. Tuning entails adjusting voltages applied to one or more of the ion trap, the corona discharge element and the collecting element. Alternatively, tuning involves adjusting the aerosol flow rate, either directly or in comparison to the flow rate of a gas conducting the ions toward merger with the aerosol. The publication is focused on the measurement of particle concentrations in terms of surface area, as such accumulated or aggregate surface area are expected to provide more useful assessments of health risks due to nanoparticle exposure. The publication actually teaches that mass concentration measurements are not useful in indicating health effects and thus would not motivate person seeking for a solution on converting measured electrical current into mass concentration to examine the technique described in the publication.

U.S. Pat. No. 8,122,711 B2, Robert Bosch GmbH, Feb. 28, 2012, concerns a procedure to ascertain a concentration of sooty particles in an exhaust gas system of an internal combustion engine or a depletion of an emission control system of the internal combustion engine due to the loading of sooty particles, whereby the sooty particle concentration in the exhaust gas system is determined by means of a collecting particle sensor, which emits a sensor signal and whereby the depletion of the emission control system due to the loading of sooty particles is determined from the sooty particle concentration. The sensor signal is corrected by means of predetermined corrections with regard to a sensor temperature and/or an exhaust gas temperature and/or a flow velocity of the exhaust gas and/or a voltage applied at the particle sensor. Transverse sensibilities of the particle sensor can thereby be taken into account during the evaluation; and the determination of the accumulated loading of sooty particles and the determination of the sooty particle concentration in the exhaust gas system are improved. In the process, the sensor temperature enters into the correction to the extent that a temperature dependence of the electrical resistance of the loading of sooty particles is determined in a preparation phase and can be taken into account during the evaluation of the sensor signal. Although the procedure improves the mass concentration measurement, it involves extra components and is thus clumsy and costly.

Publication WO 2013/132154 A1 presents a prior art solution, where a stable elevated cut-off size of measured particles is utilized to improve the accuracy of the results when indicated as mass concentration. This kind of solution can give good results, if the size distribution of measured aerosol particles is situated in limited and known size range. For optimal results, the setting of the cut-off size should be pre-set to the optimal value for each measurement based on the assumed size range. Another limitation with this kind of solution is that it cannot improve the number-concentration value of measured result.

Thus the particle sensors of the prior art possess the technical problem of the electrical current signal vs. characteristics of particles in the particle flow being sensitive to external conditions. There is need for a sensor which can measure or monitor particle characteristics even when the particle mean diameter is changing. Especially advantageous would be the improvement in the accuracy of both number and mass concentrations without presumptions of the particle size range.

BRIEF DESCRIPTION OF THE INVENTION

The object of the present invention is to provide an apparatus so as to overcome or at least alleviate the prior art disadvantages. The objects of the present invention are achieved with a process according to the characterizing portion of claim 1. The objects of the present invention are also achieved with an apparatus according to the characterizing portion of claim 9.

The preferred embodiments of the invention are disclosed in the dependent claims.

The inventor has surprisingly found a process which will solve the prior art problems described above. The invented process is based on decreasing the current signal generated by charged particles by trapping a fraction of the charged particles. The trapping is performed with at least two different cut-off diameters of the trap. One of the cut-off diameters is a reference cut-off diameter and the other is a measuring cut-off diameter. The measuring cut-off diameter is adjusted dynamically, meaning changing the cut-off diameter at least between successive measurement cycles or even continuously during a measurement cycle, based on the current signals generated by the charged particles. Such a process leads to significant improvement in reducing the measurement error generated by changing count median diameter (CMD) of particles under measurement. A change in CMD causes a change in the current signal caused by the measuring cut-off diameter thus causing a change in the measuring cut-off diameter.

The electrical current carried by charged particles depends on the particle size distribution of the measured particles. Lognormal particle size distribution has been found to apply to most single-source aerosols such as e.g. combustion engine or stack emission aerosols. The lognormal distribution is used extensively for aerosol size distributions because it fits the observed size distributions reasonably well, which is obvious as such for a person skilled in the art. The lognormal distribution can be characterized with the median particle diameter, which is different for number concentration and mass concentration, the median particle diameter for number concentration being smaller than the median particle diameter for mass concentration. Particle mass depends also on particle density and particle shape, which is frequently characterized by fractal dimensions. The fractal dimensions are well known for a person skilled in the art and are described e.g. in William C. Hinds, Aerosol Technology—Properties, Behavior, and Measurement of Airborne Particles, $2^{nd}$ edition, Jonhn Wiley & Sons, 1999, pages 408-412 and in Maricq and Wu, The effective density and fractal dimensions of soot particles from premixed flames and motor vehicle exhaust, Aerosol Science 35 (2004), pp. 1251-1274. With single-source aerosols the changes in the conditions affecting particle formation mainly change the median diameter, other parameters affecting particle charging remaining essentially persistent.

The invented process for measurement of particle characteristics comprises guiding sample flow Q comprising particles through a passage, electrically charging particles and measuring the electrical current carried by said charged particles. The invented process further comprises trapping essentially all free ions and a particles P with diameter smaller than cut-off diameter $D_{C\text{-}O}$ with trapping means, such as a particle trap, by adjusting trap cut-off diameter to measuring cut-off diameter $D_{trap}$ resulting a measured electrical current $I_{trap}$ which is measured, and adjusting the cut-off diameter to reference level $D_{ref}$ trapping essentially all free ions only resulting a reference electrical current $I_{ref}$ which is measured. The cut-off diameter $D_{trap}$ is adjusted based on the measured electrical current $I_{trap}$ and the reference electrical current $I_{ref}$ so that the cut-off diameter $D_{trap}$ can be set near the count median diameter and finally converting the measured electrical current signal $I_{trap}$ to a specific particle characteristics value, such as particle count, surface area, mass concentration, particle size distribution or some other metric of interest. The described embodiments focus on determining mass concentration of a particle flow but the same apparatus and process can be used to determine other particle characteristics as well.

Particle measurement, which includes particle charging and measurement of the electrical charge carried by charged particles requires that the free ions, i.e. ions which are not attached to particles, are removed. The design of an ion trap used to remove the free ions can be carried out either by calculations or by experiments. Ion trapping is based on the electrical mobility of charged particles, $Z_p = n\, e\, C_c / 3\, \pi\, \eta\, D_p$, where $Z_p$=Electrical mobility, n=Number of charges on the particle, e=Elementary charge, $C_c$=Cunningham slip correction, $\eta$=Dynamic viscosity of air and $D_p$=Radius of particle. As essentially all free ions need to be removed, the ion trap is typically designed to trap also ultrafine charged particles, which—due to their low concentration and mass—do not essentially affect the number or mass concentration measurement. A typical design of an electrical ion trap would have a particle cut-off diameter of 4 nm, i.e. it removes all charged particles having a diameter of 4 nm or less.

The conversion factor which is used to convert the measured electrical current, usually expressed in fA to mass concentration value, usually expressed in $mg/m^3$, depends on the mechanism of particle formation. Within similar single-source particles, the conversion factor depends mainly on the median particle diameter. Thus the conversion factor should be changed as the median particle diameter changes to acquire a reliable current-to-mass concentration conversion. However, as the changes in the median particle diameter are not known, such conversion factor adjustment cannot be made. For a well-known particle source, such as for particle formation within combustion engines, the changes in the median diameter as a function of a second-grade parameter, such as e.g. combustion engine torque could be determined. Information in the change of the second-grade parameter (such as engine torque) could then be used to adjust the conversion factor. Such operations are, however, clumsy and expensive.

Surprisingly the inventor has found that the sensitivity of the correlation factor to the changes of the median diameter can be significantly reduced by dynamically adjusting the trap voltage with changing count median diameter. The adjusting can be realized by constantly or intermittently comparing the measured electric current $I_{ref}$ when essentially all free ions are only trapped (i.e. particle cut-off diameter around 4 nm) and the electric current $I_{trap}$ when free ions and charged particles having diameter below the particle cut-off diameter of the particle trap are trapped. A higher cut-off diameter $D_{trap}$ which also traps particles produces a smaller measured electrical current $I_{trap}$ for a sample flow Q than the electrical current $I_{ref}$ measured for the same sample flow but using a lower cut-off diameter $D_{ref}$ which removes essentially all free ions only. The $I_{trap}/I_{ref}$ ratio can be calculated after each measurement and maintained essentially constant by adjusting cut-off diameter $D_{trap}$ as the count median diameter varies in the sample flow Q. Therefore, the measuring and comparing of the reference electric current $I_{ref}$ and the measuring electric current $I_{trap}$ is repeated one or more times for setting the cut-off diameter $D_{trap}$ near the count median diameter (CMD).

According to the above mentioned the process for measurement of particle characteristics may comprise:

a) guiding a sample flow Q comprising particles P, P*, with a count median diameter of CMD and a certain particle size distribution, through a passage (2);

b) electrically charging particles P, P*;

c) measuring the electrical current carried by said charged particles;

d) trapping essentially all free ions and charged particles having particle diameter smaller than trap cut-off diameter $D_{c-o}$, the cut-off diameter $D_{c-o}$ being the particle diameter above which penetration through the trapping means essentially deviates from zero;

e) adjusting the trapping means to adjust the trap cut-off diameter $D_{c-o}$ based on measured electrical current carried by said charged particles;

f) adjusting the cut-off diameter of the trapping means to a reference cut-off diameter $D_{ref}$ and to a measuring cut-off diameter $D_{trap}$ resulting a reference electrical current $I_{ref}$ and a measured electrical current $I_{trap}$ carried by said charged particles;

g) comparing the reference electric current $I_{ref}$ and the measuring electric current $I_{trap}$;

h) dynamically adjusting the measuring cut-off diameter $D_{trap}$ based on the comparing of the reference electrical current $I_{ref}$ and the measuring electrical current $I_{trap}$.

The particle trap can be implemented by using known particle trap designs. An example of a suitable particle trap is a voltage trap having a trap voltage applied and thus creating an electric field between plates or other conductive electrodes of the voltage trap. Some of the particles of the particle flow Q are trapped from the flow as the particle flow passes through the electric field. The cut-off diameter of the voltage trap can be adjusted by adjusting the electric field created by the voltage trap. The electric field in turn can be adjusted by changing the voltage applied on the plates of the voltage trap. In this case $D_{ref}$ is achieved by adjusting the trap voltage to reference voltage $V_{ref}$ and $D_{trap}$ is achieved by adjusting the trap voltage to measuring voltage $V_{trap}$. Another way is to change the dimensions of the voltage trap, for example by moving the plates closer to each other or further away from each other.

Another example of a suitable particle trap is of a diffusion type which typically comprises diffusion trap, such as a coarse filter, followed by a dense particle filter. Some of the particles of the particle flow Q are trapped from the flow as the particle flow passes through the diffusion trap. The cut-off diameter of the diffusion trap can be adjusted by adjusting the period of time that the particles of the flow travel through the diffusion trap. A shorter time period results lower cut-off diameter than a longer time period. The cut-off diameter can thus be adjusted by altering speed of the particle flow through the diffusion trap, for example by adjusting the speed of particle flow or by introducing an adjustable purge flow, i.e. a sheath flow, of particle-free gas, such as clean air, prior to the diffusion trap in the direction of the particle flow. Thus $D_{ref}$ can be achieved by adjusting the speed of the particle flow directly or by introducing and adjusting the purge flow to the particle flow so that the particle flow travels at reference flow $Q_{ref}$ and $D_{trap}$ is achieved by adjusting the flow speed to measuring flow $Q_{trap}$.

In an embodiment comprising a voltage trap the process for measurement of particle characteristics comprises guiding sample flow Q comprising particles through a passage, electrically charging particles and measuring the electrical current carried by said charged particles. The invented process further comprises trapping essentially all free ions and a particles P with diameter smaller than cut-off diameter by an electrical field with trapping means by adjusting trap voltage to $V_{trap}$ resulting an electrical current $I_{trap}$ which is measured, and adjusting the trap voltage to $V_{ref}$ trapping essentially all free ions only resulting an electrical current $I_{ref}$ which is measured. The trapping voltage $V_{trap}$ is adjusted based on the measured electrical currents $I_{trap}$ and $I_{ref}$ so that the cut-off diameter $D_{trap}$ can be set near the count median diameter and finally converting the electrical current signal $I_{trap}$ to a specific particle characteristics value, such as particle count, surface area, mass concentration, particle size distribution or some other metric of interest. The described embodiments focus on determining mass concentration of a particle flow but other particle characteristics can be determined as well using the same device and method.

In an embodiment comprising a diffusion trap, the process for measurement of particle characteristics comprises guiding sample flow Q comprising particles through a passage, electrically charging particles and measuring the electrical current carried by said charged particles. The invented process further comprises trapping essentially all free ions and a particles P with diameter smaller than cut-off diameter by a diffusion trap with trapping means by adjusting the flow prior to the diffusion trap to $Q_{trap}$ resulting an electrical current $I_{trap}$ which is measured at particle filter following the diffusion trap, and adjusting the flow to $Q_{ref}$ trapping essentially all free ions only resulting an electrical current $I_{ref}$ which is measured at particle filter or by combining currents of diffusion trap and particle filter. The flow $Q_{trap}$ is adjusted based on the measured electrical currents $I_{trap}$ and $I_{ref}$ so that the cut-off diameter $D_{trap}$ can be set near the count median diameter and finally converting the electrical current signal $I_{trap}$ to a specific particle characteristics value, such as particle count, surface area, mass concentration, particle size distribution or some other metric of interest. The described embodiments focus on determining mass concentration of a particle flow but other particle characteristics can be determined as well using the same device and method.

In an embodiment the two electrical currents resulting from the two trap voltages can be measured from two voltage traps where a first trap has trap voltage $V_{ref}$ and a second trap has trap voltage $V_{trap}$ which is adjusted based on the current ratio. The first and second voltage traps voltage traps can be arranged in cascade or in parallel and having the electrical current measurement arranged after each voltage trap. This arrangement allows continuous monitoring of the current ratio and thus a continuous adjusting is possible.

In an embodiment also a single voltage trap and measurement arrangement can be used if the trap voltage is altered between $V_{ref}$ and $V_{trap}$ in cycles. One or more measurement voltages $V_{trap}$ can be used. There is a finite setting time for the current measurement after the trap voltage is adjusted and therefore the adjustment is intermittent when only one voltage trap is used and the trap voltage is alternating. The trap voltage may be switched between $V_{ref}$ and one or more $V_{trap}$ voltages every few seconds, for example every three seconds or within a range from 10 milliseconds to 100 seconds. The CMD of a particle flow typically changes slower than that.

The trap voltage $V_{trap}$ is advantageously adjusted in such a way that the measured ratio of electrical currents $I_{trap}/I_{ref}$ is preferably between 0.3 and 0.7 smaller and even more preferably between 0.4 and 0.6 and most preferably about 0.5. When the ratio is about 0.5 the cut-off diameter of the voltage trap is typically about the same as the count median diameter of the particle flow Q.

Shape or width of the particle size distribution is the second most important factor after the count median diameter when calculating the particle mass concentration value. In an embodiment the particle size distribution is approximated by calculation derivative of the measured ratio of electrical currents $I_{trap}/I_{ref}$ with respect to trap voltage near the ratio 0.5. The trap voltage $V_{trap}$ can be deviated from the value that results the ratio 0.5 or the values that were measured before the ratio reached 0.5 can be used. For example a measuring cycle with the ratio changing from 0.3 to 0.7 in a number of steps can be carried out and the width of the particle size distribution can be approximated from the results.

In an embodiment the trap voltage $V_{trap}$ can be dynamically adjusted so that it sets and maintains the trap cut-off diameter $D_{c-o}$ on a desired position on a curve representing the particle size distribution or the electrical current response of the particle size distribution curve. Advantageously the trap cut-off diameter $D_{c-o}$ is adjusted to inflexion point at the curve representing $I_{trap}$ as a function of $V_{trap}$. The inflexion point can be found for example by analyzing distortion of a constantly modulated signal. The even harmonics of the distortion go to zero at the inflexion point and this can be detected for example by monitoring second order harmonics of $I_{ref}$ and correlating it with $I_{trap}$. This enables use of smaller deviation than the method where ratio of currents is driven to about 0.5 so a higher frequency can be used. Another advantage is that the deviation between trap voltages and resulting electrical currents can be used in approximating the width of the particle size distribution.

It is to be noted that as the electrical current is mainly carried by small particles whose count is larger than the count of large particles where most of the particle mass is, the influence of reducing the current signal does not as much affect the amount of particle mass flowing through the measurement passage. Thus the trap voltage can be preferably adjusted to a value where the trap cut-off diameter $D_{c-o}$ is essentially equal to the count median diameter (CMD) of particles in sample flow Q. Essentially in this case means e.g. that the ratio of electrical currents $I_{trap}/I_{ref}$ is preferably between 0.3 and 0.7. An advantage of the process and arrangement is that the count median diameter can be ignored when setting up the apparatus. The process will guide the apparatus to an optimal operating point soon after starting by comparing the ratio of electrical currents resulting from the initial trap voltage values and adjusting $V_{trap}$ accordingly.

BRIEF DESCRIPTION OF THE FIGURES

In the following the invention will be described in greater detail, in connection with preferred embodiments, with reference to the attached drawings, in which.

DETAILED DESCRIPTION OF THE INVENTION

Figure 1:
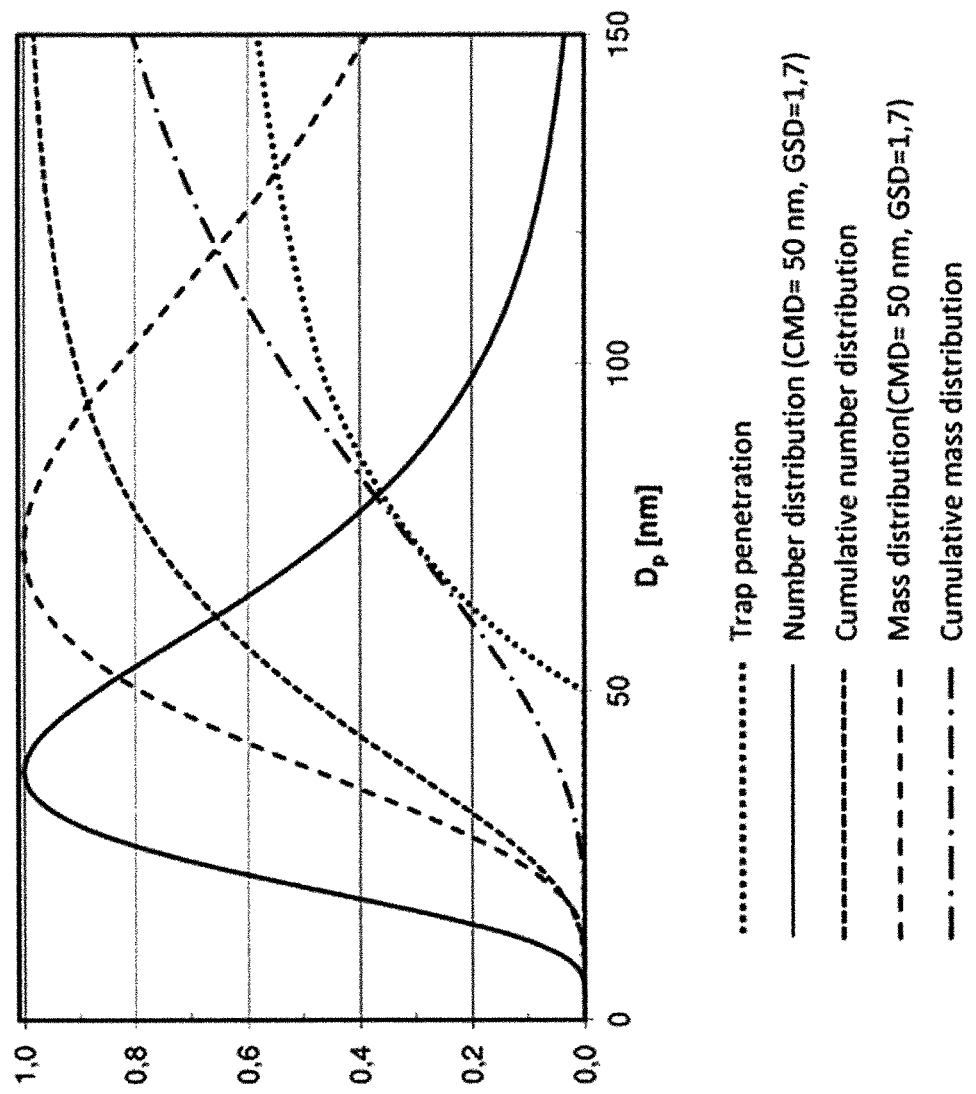
FIG. 1 shows trap penetration, number distribution and mass distribution of a typical single-source aerosol where the particle concentration obeys lognormal distribution.

FIG. 1 shows a typical example of a lognormal particle size distribution. Such particle size distribution with count median diameter (CMD), i.e. the particle diameter where the cumulative number distribution hits 0.5 being around 50 nm and geometric standard deviation (GSD) around 1.7 could well represent particle size distribution from diesel engine exhaust. As seen from the figure, the mass median diameter is almost twice as high as CMD. In FIG. 1 the trap voltage is set to a value which corresponds to cut-off diameter of 50 nm. Penetration through the trap is essentially zero for particles smaller than the cut-off diameter and above it the trap penetration smoothly increases.

Figure 2:
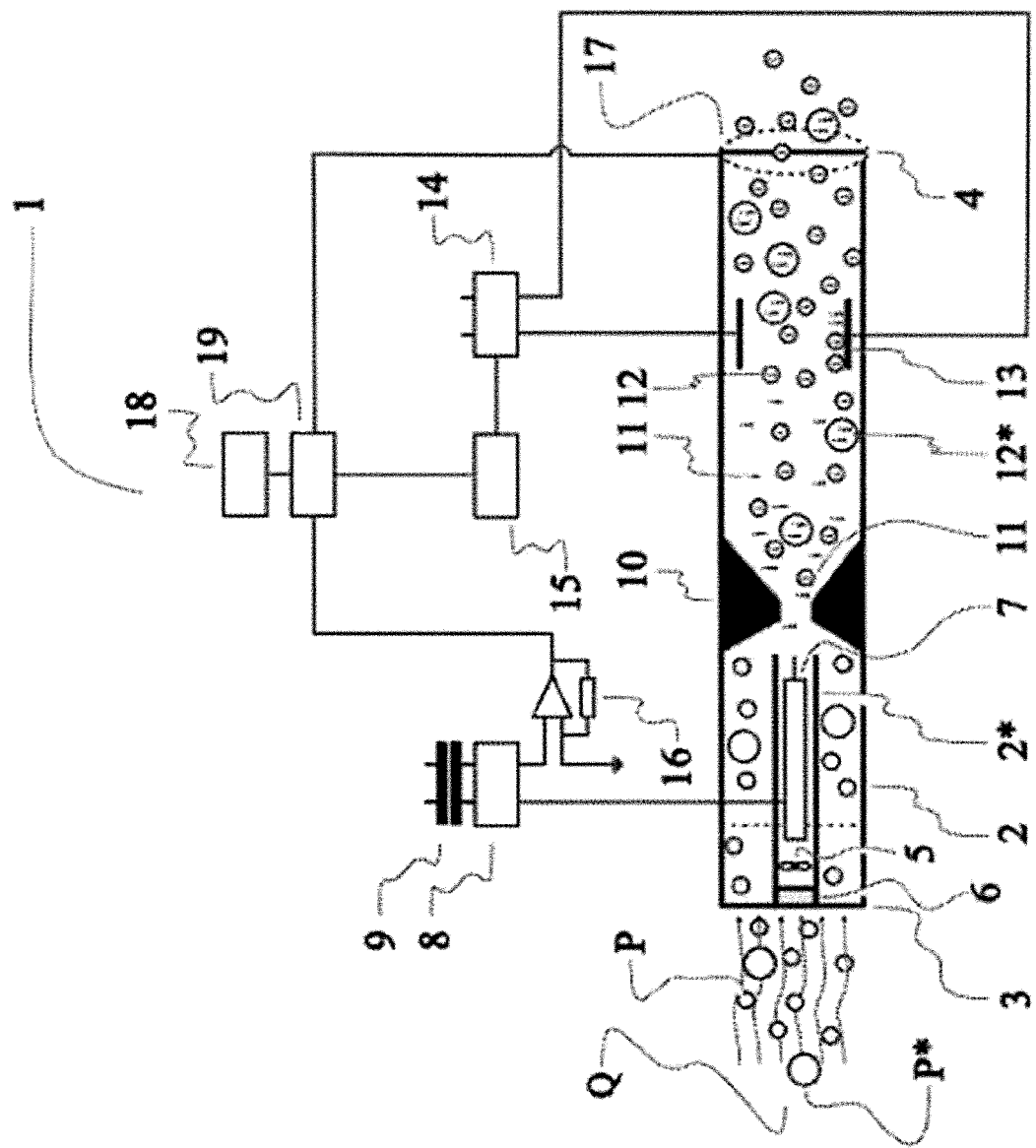
FIG. 2 is a schematic view of one embodiment of the invented apparatus.

FIG. 2 shows one embodiment of the invented apparatus 1 for particle mass concentration measurement. Apparatus 1 comprises passage 2 with inlet 3 and outlet 4 for guiding sample flow Q comprising particles P, P* with a certain particle size distribution through apparatus 1. The flow Q through passage 2 can be realized in various ways such as by using a pump, by using chimney effect or by using ion wind. In the embodiment of FIG. 2, fan 5 drives air into inner passage 2* through filter 6. This air is passed next to the means 7, 8 for ionizing the air. In one embodiment of the present invention, the means 7, 8 for ionizing the air are realized by a corona discharge unit 7, powered by a high voltage source 8, which is electrically isolated from mains with an isolation transformer 9. The ionized air forms the motive fluid flow of ejector 10 placed inside passage 2. The ejector generates an underpressure, i.e. pressure lower than ambient pressure, which drives sample flow Q with different size particles P, P* into apparatus 1 vial inlet 3. The ionized air and particles are effectively mixed in the mixing zone 11 and thus particles P,P* are charged 12, 12*. Free ions, which as described previously may also be very fine charged particles, are removed by trapping means 13. The trapping means can comprise for example an electrostatic precipitator, i.e. a voltage trap, removing small charged particles due to their high electrical mobility in an electrical field or a coarse filter, i.e. a diffusion trap. The necessary trap voltage for the voltage trap is generated by a power source 14, which is controlled by control means 15 for controlling the trap voltage. In another embodiment of the present invention the trapping means 13 may be connected to the control means 15 which control the distance of the trapping electrodes and the electrical field strength is adjusted by adjusting the electrode separation without necessarily adjusting the electrical voltage across the trap electrodes. In an embodiment a flow prior to the diffusion trap is generated by an air pump which is controlled by means for controlling the flow. The electrical current carried by particles escaping passage 2 via outlet 4 is measured using means 16, 17 for measuring electrical current carried by charged particles. Although the preferable way to measure the current is to use means 16 for measuring the escaping current, i.e. the electrical current escaping from apparatus 1 with the particles, other current measurement techniques, such as electrodes or a particle filter collecting at least a fraction of the charged particles may be used as well. The measured current is converted to mass concentration value using suitable means 18, which may be situated in apparatus 1 or the conversion may be carried out elsewhere, e.g. by recording the current values and providing the conversion afterwards.

In the apparatus 1 the trapping means 13 for trapping essentially all free ions 11 and charged particles 12 having particle diameter smaller than trap cut-off diameter $D_{c-o}$, the cut-off diameter $D_{c-o}$ being the particle diameter above which penetration through the trapping means 13 essentially deviates from zero, are connected to the control means 15 for adjusting the trapping means 13 to adjust the trap cut-off diameter $D_{c-o}$. It is essential to the present invention that the trapping means 13 are adjusted to cut-off diameter $D_{trap}$, which is significantly higher than the diameter of the essentially free ions, i.e. trapping means 13 remove a significant amount of charged particles from particle flow Q and that the trapping means 13 are adjusted to cut-off diameter $D_{ref}$, which is about the same as the diameter of the essentially free ions. By analyzing the electric currents carried by the charged particles that penetrate the trap and/or are captured by the trap the higher cut-off diameter $D_{trap}$ can be adjusted to a value which facilitates measuring of particle characteristics of interest. For example, when measuring mass concentration of particles, the cut-off diameter $D_{trap}$ can be adjusted to essentially match the count median diameter of the particles in the particle flow Q. Preferably apparatus 1 comprises means 18 for converting the electrical current signal to particle mass concentration value.

Figure 3:
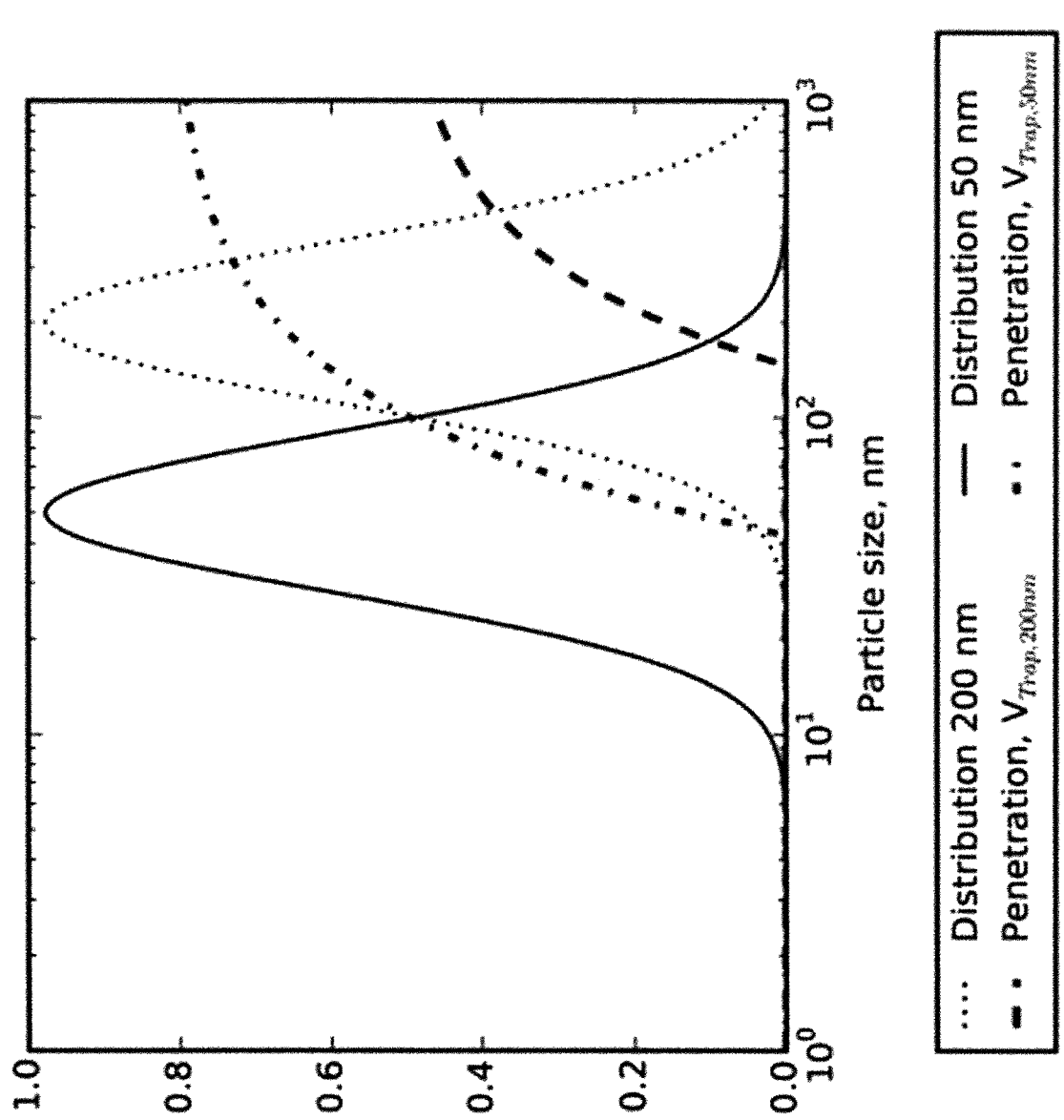
FIG. 3 shows two different trap distribution curves and two penetration curves at different trap voltages.

FIG. 3 illustrates particle distribution curves with count median diameter of 50 nm and 200 nm. FIG. 3 also illustrates penetration through the particle with cut-off diameters corresponding to the CMD's of distribution curves. Note that the x-axis representing particle size is logarithmic. When the particle distribution is 50 nm CMD and corresponding cut-off diameter is set at 50 nm, the current measured after the trap is about 50% of the current with cut-off diameter at about 4 nm. By looking at the 50 nm distribution and the 200 nm penetration curves, it is evident that the portion of the particle flow penetrating the trap is very small and thus represents poorly the particle flow and thus leads to significant unreliability when it is used as basis for calculating characteristics of the particle flow. Correspondingly, with 200 nm distribution curve and $D_{trap}$ at 50 nm cut-off diameter, the amount of trapped particles is almost the same as with reference cut-off diameter $D_{ref}$ at about 4 nm. Thus it is important to change the cut-off diameter as the CMD of the particle flow changes. As said, the cut-off diameter can be changed e.g. by adjusting trap voltage of the voltage trap or by adjusting flow prior to the diffusion trap.

In an embodiment wherein the apparatus comprises a voltage trap it has been found advantageous to be able to adjust the trap voltage during normal operation of apparatus 1. Thus in one embodiment of the present invention apparatus 1 comprises means 19 for controlling the control means 15 for adjusting the trapping means 13 on the basis of the output of the means 16,17 for measuring the electrical current carried by said charged particles 12, 12*. In such embodiment of the present invention the trap voltage is adjusted during the measurement. First the control means 15 for adjusting the trapping means 13 set the trap voltage to a value which ensures the removal of essentially all free ions 11, e.g. the trap voltage is set to reference voltage value $V_{ref}$ which corresponds to particle cut-off diameter $D_{ref}$ of around 4 nm or less. The current $I_{ref}$ carried by charged particles 12, 12* is measured using current measurement means 16, 17. Then the means 19 for controlling the control means 15 for adjusting trapping means 13 increase trap voltage to a higher level $V_{trap}$ and the current $I_{trap}$ measured by means for current measurement 16, 17 is smaller than $I_{ref}$ because the higher trap voltage $V_{trap}$ traps not only free ions but also particles from the sample flow Q and thus lowers the measured current. This trap voltage $V_{trap}$ is the measuring voltage which is used in actual mass concentration measurements. $V_{trap}$ can be controlled so that the particle cut-off diameter $D_{trap}$ is about the same as count median diameter. With such trap voltage the sensitivity of the current/mass conversion to changes of median particle diameter is significantly reduced. One or more $V_{trap}$ values can be used. For example alternating $V_{trap}$ to lower and higher than said voltage resulting $D_{trap}$ near the CMD produces also information about the distribution of particle diameter in the particle flow Q. For example the particle diameter distribution is broad if said lower and higher $V_{trap}$ voltages result only a minor change in electrical current $I_{trap}$ compared to a situation where the same change in voltage $V_{trap}$ results a major change in $I_{trap}$.

Similarly, in an embodiment wherein the apparatus comprises a diffusion trap it has been found advantageous to be able to adjust the flow during normal operation of apparatus 1. Thus in one embodiment of the present invention apparatus 1 comprises means 19 for controlling the means 15 for adjusting the trapping means 13 on the basis of the output of the means 16,17 for measuring the electrical current carried by said charged particles 12, 12*. In such embodiment of the present invention the flow is adjusted during the measurement. First the control means 15 for adjusting the trapping means 13 set the flow to a value which ensures the removal of essentially all free ions 11, e.g. the flow is set to reference flow value $Q_{ref}$ which corresponds to particle cut-off diameter $D_{ref}$ of around 4 nm or less. The current $I_{ref}$ carried by charged particles 12, 12* is measured using current measurement means 16, 17. Then the means 19 for controlling the control means 15 for adjusting trapping means 13 increase flow to a higher level $Q_{trap}$ and the current $I_{trap}$ measured by means for current measurement 16, 17 is smaller than $I_{ref}$ because the higher flow $Q_{trap}$ traps not only free ions but also particles from the sample flow Q and thus lowers the measured current. This flow $Q_{trap}$ is the measuring flow which is used in actual mass concentration measurements. $Q_{trap}$ can be controlled so that the particle cut-off diameter $D_{trap}$ is about the same as count median diameter. With such flow the sensitivity of the current/mass conversion to changes of median particle diameter is significantly reduced. One or more $Q_{trap}$ values can be used. For example alternating $Q_{trap}$ to lower and higher than said flow resulting $D_{trap}$ near the CMD produces also information about the distribution of particle diameter in the particle flow Q. For example the particle diameter distribution is broad if said lower and higher $Q_{trap}$ values result only a minor change in electrical current $I_{trap}$ compared to a situation where the same change in flow $Q_{trap}$ results a major change in $I_{trap}$. An ion trap for capturing free ions and smallest particles can be used between the means 7, 8 for electrically charging particles P, P* and the diffusion trap. Said ion trap can be a voltage trap.

Similarly, the principles of other embodiments comprising a voltage trap can be implemented with a diffusion trap by replacing voltages $V_{ref}$, $V_{trap}$ of a voltage trap by flows $Q_{ref}$, $Q_{trap}$ introduced into the passage 2 prior to the diffusion trap. The voltage adjustment and the flow adjustment both have a similar effect of changing the cut-off diameter of the particle trap. Therefore in the following embodiments concerning use of a voltage trap, the voltage trap and voltages can be substituted with a diffusion trap and flows with minor or no changes in operation principle of the apparatus. Thus to avoid unnecessary repetition and for the sake of consistency, the embodiments have been described concerning the voltage trap.

In an embodiment $V_{trap}$ is controlled by targeting ratio S to a desired reference value $S_{ref}$, wherein $S=I_{trap}/I_{ref}$ and $S_{ref}$ is between 0.3 to 0.7 and preferably 0.5 which results the particle cut-off diameter $D_{trap}$ to be about the same as median particle diameter. The measuring voltage $V_{trap}$ is adjusted until $S_{ref}$ is reached. The initial value of $V_{trap}$ can be a fixed value, a guess or same as $V_{ref}$. The next value can be calculated for example from equation $$V_{trap+1}=V_{trap}-k*(S-S_{ref})*dt/tau,$$

where $V_{trap+1}$ is the next value, $V_{trap}$ is the current trap voltage, k is a steepness coefficient, S is the current ratio, dt is a sampling period and tau is a time constant. When $V_{trap}$ reaches a value where $S=S_{ref}$ the count median diameter can be approximated with $CMD=f(V_{trap})=a*V_{trap}+b$, where a and b and calibration factors.

In an embodiment reference electrical current $I_{ref}$ results from reference voltage $V_{ref}$ of a first voltage trap. Measuring electrical current $I_{trap}$ results from measuring voltage $V_{trap}$ of a second voltage trap. The measuring voltage $V_{trap}$ is adjusted based on ratio S of said electrical currents which are measured with measuring means after each voltage trap. The first and second voltage traps voltage traps can be arranged in cascade so that the particle flow Q travels first through the voltage trap having reference voltage and the through the voltage trap having measuring voltage. The first and second voltage traps voltage traps can also be arranged in parallel so that the particle flow Q is divided into the two voltage traps. The cascade and parallel arrangements allow for continuous monitoring of the current ratio and thus a continuous adjusting is possible. In an embodiment also a single voltage trap and measurement arrangement can be used if the trap voltage is altered between $V_{ref}$ and $V_{trap}$ in cycles. Therefore the adjustment is carried out in iterating manner and/or the adjusting is repeated one or more times.

Shape or width of the particle size distribution is the second most important factor after the count median diameter when calculating the particle mass concentration value. In an embodiment the particle size distribution is approximated by calculating derivative $dS/dV_{trap}$ in the vicinity of $S=0.5$. The trap voltage $V_{trap}$ can be adjusted e.g. in order to reach values 0.3; 0.4; 0.5; 0.6 and 0.7 for S. Also the measurements which were made before the ratio S reached 0.5 can be used. The width of the particle size distribution can be approximated from the results and calibration factors a and b can be determined for $CMD=a*V_{trap}+b$.

In an embodiment the trap voltage $V_{trap}$ can be dynamically adjusted so that it sets and maintains the trap cut-off diameter $D_{trap}$ on a desired position on a curve representing the particle size distribution or the electrical current response of the particle size distribution curve. Advantageously the trap cut-off diameter $D_{trap}$ is adjusted to inflexion point at the curve representing $I_{trap}$ as a function of $V_{trap}$, where the trap cut-off diameter $D_{trap}$ essentially matches the count median diameter. The inflexion point can be found for example by analyzing distortion of a continuously modulated signal.

Figure 4:
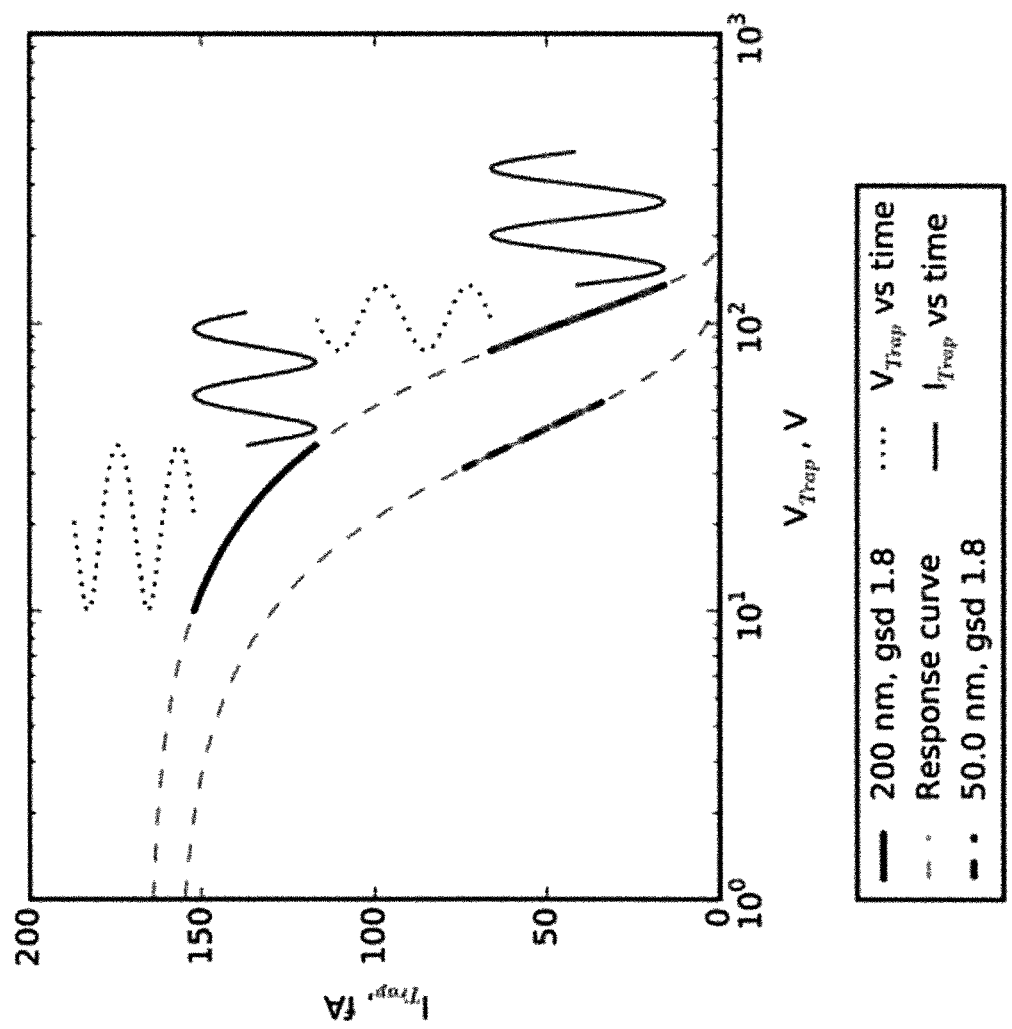
FIG. 4 shows the effect of continuously modulated trap voltage on measured current.

FIG. 4 shows the fundamentals of calculating the inflexion point. The trap voltage $V_{trap}$ can be for example sine wave or square wave or some other waveform. As the response curve is not linear in used voltage range of $V_{trap}$ far from the inflexion point, the resulting $I_{trap}$ (near 150 fA range) is distorted and comprises even harmonics, especially second order harmonics. The even harmonics of the distortion go to zero near the inflexion point where the response curve is linear in the used voltage range of $V_{trap}$ and this can be detected for example by monitoring second order harmonics of $I_{ref}$ and correlating it with $I_{trap}$. Another way is to square the voltage signal $V_{trap}$ and find a zero point of correlation between current signal $I_{trap}$ and squared voltage signal. Squaring the voltage signal introduces second order harmonics to the squared signal. Second order harmonics do not exist in current signal when operating near the inflexion point and thus the correlation would be zero with squared voltage signal. This method allows the acquisition of both the CMD and concentration signals continuously, independent of each other, with higher frequency due to no need for settling time between different voltage levels. Another advantage is that the deviation between trap voltages and resulting electrical currents can be used in approximating the width of the particle size distribution, for example by comparing amplitude of $I_{trap}$ and amplitude of $V_{trap}$. Known signal processing methods or transformations, such as logarithm conversion or squaring, are preferably used to convert $I_{trap}$ and $V_{trap}$ signals during or before comparison or other analyses.

An aspect of the invention is a process for particle mass concentration measurement. The method comprises guiding sample flow Q comprising particles P, P*, with a count median diameter of CMD and a certain particle size distribution, through a passage 2 and electrically charging particles P, P*. The process also comprises measuring the electrical current carried by said charged particles 12, 12*, trapping essentially all free ions 11 and charged particles 12 having particle diameter smaller than trap cut-off diameter $D_{c-o}$, the cut-off diameter $D_{c-o}$ being the particle diameter above which penetration through the trapping means 13 essentially deviates from zero and adjusting the trapping means 13 to adjust the trap cut-off diameter $D_{c-o}$ based on measured electrical current carried by said charged particles 12, 12*. The process further comprises adjusting a trap voltage of the trapping means 13 to a reference cut-off diameter $D_{ref}$ and to a measuring cut-off diameter $D_{trap}$ resulting a reference electrical current $I_{ref}$ and a measuring electrical current $I_{trap}$ carried by said charged particles 12, 12*, and dynamically adjusting the measuring cut-off diameter based on the measurements of the reference electrical current $I_{ref}$ and the measuring electrical current $I_{trap}$.

In an embodiment the process further comprises adjusting of the cut-off diameter and alternating the cut-off diameter between a reference cut-off diameter $D_{ref}$ and at least one measuring cut-off diameter $D_{trap}$ resulting a reference electrical current $I_{ref}$ and at least one measuring electrical current $I_{trap}$ carried by said charged particles 12, 12*.

In an embodiment the process further comprises adjusting a trap voltage of the trapping means 13 to a reference voltage $V_{ref}$ and to a measuring voltage $V_{trap}$ resulting a reference electrical current $I_{ref}$ and a measuring electrical current $I_{trap}$ carried by said charged particles 12, 12*, and dynamically adjusting the measuring voltage based on the measurements of the reference electrical current and the measuring electrical current, wherein the trapping means comprises a voltage trap.

In an embodiment the process further comprises adjusting a flow of the trapping means 13 to a reference flow $Q_{ref}$ and to a measuring flow $Q_{trap}$ resulting a reference electrical current $I_{ref}$ and a measuring electrical current $I_{trap}$ carried by said charged particles 12, 12*, and dynamically adjusting the measuring flow based on the measurements of the reference electrical current and the measuring electrical current, wherein the trapping means comprises a diffusion trap.

In an embodiment the process further comprises adjusting cut-off diameter to occasionally deviate the measuring cut-off diameter from the level which results said desired ratio, and estimating the particle size distribution based on derivative of said ratio with respect to the measuring cut-off diameter.

In an embodiment the process further comprises dynamically adjusting the measuring cut-off diameter for setting and maintaining the trap cut-off diameter $D_{trap}$ on a desired position on a curve representing the particle size distribution.

In an embodiment the adjusting of the flow of the trapping means 13 comprises adjusting a purge flow of particle free gas prior to the diffusion trap for adjusting the flow. The purge flow is introduced to the particle flow Q for increasing the speed of the particles in the flow which then changes the cut-off diameter of the diffusion trap.

Figure 5:
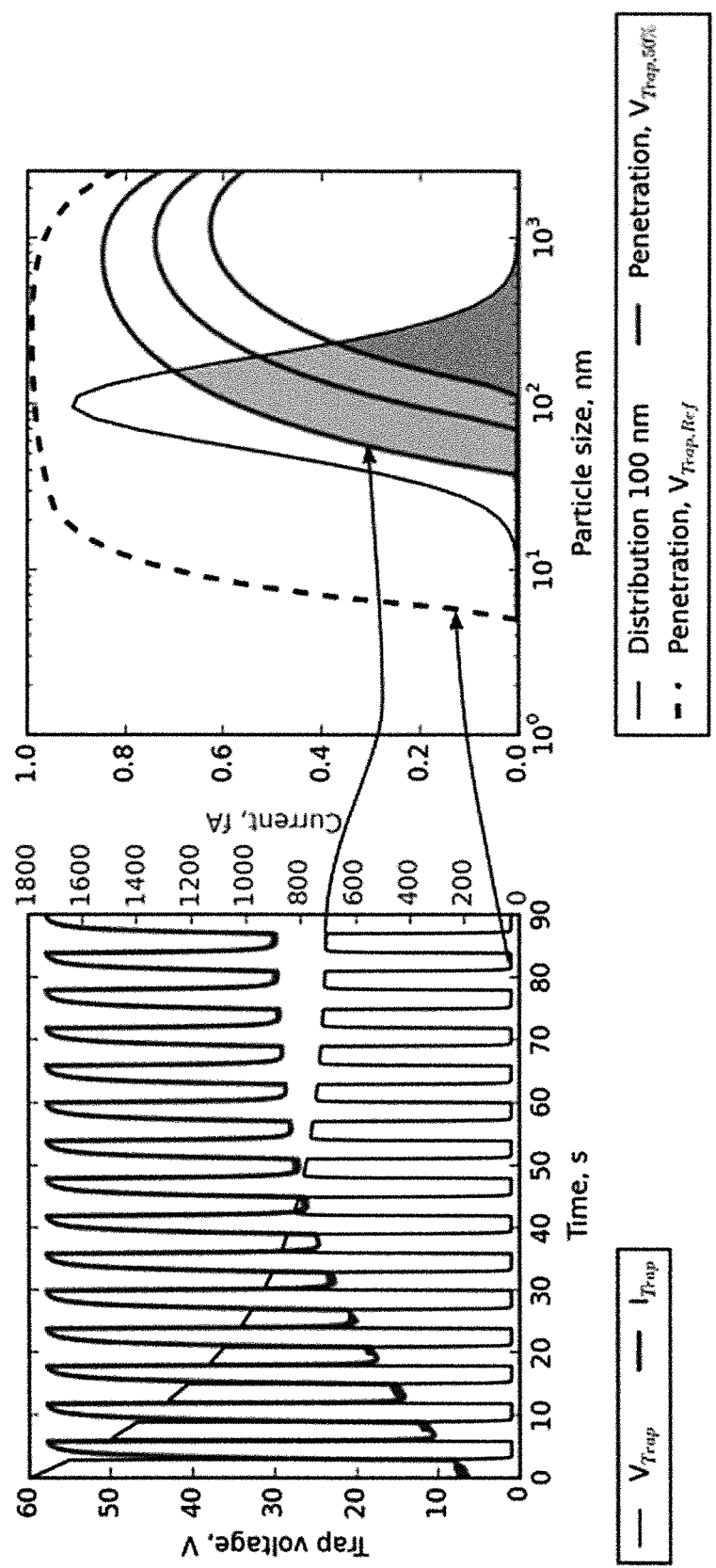
FIG. 5 shows trap voltage and trap current for a typical measurement response to a changing particle size and particle number size distribution as well as trap penetration functions for different trap voltages.

FIG. 5 shows trap voltage and trap current in the left panel for a typical measurement response to a changing particle size. The right panel shows the particle number size distribution as well as trap penetration functions for different trap voltages corresponding to the trap voltages in the left panel. The shaded areas of the size distribution correspond to measured particles at different trap voltages. When suitable V_trap is found, current is half of current $I_{trap}$ at reference trap voltage $V_{Ref}$.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. Process for measuring characteristics of a particle flow, comprising steps:
 a) guiding a sample flow comprising particles through a passage;
 b) electrically charging the particles;
 c) trapping essentially all free ions and charged particles having a particle diameter smaller than a trap cut-off diameter, the cut-off diameter being a particle diameter above which penetration through the trapping means essentially deviates from zero;
 d) measuring an electrical current carried by said charged particles that are not trapped;
 e) adjusting the trapping means to adjust the cut-off diameter based on the measured electrical current carried by said charged particles that are not trapped;
 f) adjusting the trapping means to adjust the cut-off diameter to a reference cut-off diameter and to a measuring cut-off diameter resulting in a measured reference electrical current and a measured electrical current, respectively, carried by said charged particles that are not trapped;
 g) comparing the measured reference electric current to the measured electrical current; and
 h) dynamically adjusting the trapping means to adjust the measuring cut-off diameter based on the comparing of the measured reference electrical current to the measured electrical current.

2. Process of claim 1, comprising repeating steps a) to h) one or more times.

3. Process of claim 1, wherein
 step f) comprises adjusting a trap voltage of the trapping means to a reference voltage and to a measuring voltage resulting in the measured reference electrical current and the measured electrical current, respectively, carried by said charged particles that are not trapped; and
 step h) comprises dynamically adjusting the measuring voltage based on the comparing of the measured reference electrical current and the measured electrical current, wherein the trapping means comprises a voltage trap.

4. Process of claim 1, wherein
 step f) comprises adjusting a flow of the sample flow to a reference flow and to a measuring flow resulting in the measured reference electrical current and the measured electrical current, respectively, carried by said charged particles that are not trapped; and
 step h) comprises dynamically adjusting the sample flow based on the comparing of the measured reference electrical current to the measured electrical current, wherein the trapping means comprises a diffusion trap.

5. Process as in claim 4, wherein the adjusting of the sample flow comprises adjusting a purge flow of particle free gas prior to the diffusion trap.

6. Process as in claim 1, comprising adjusting the trapping means to adjust the cut-off diameter to occasionally deviate the measuring cut-off diameter from a level which results in a desired ratio of the measured reference electrical current and the measured electrical current, and estimating a particle size distribution based on derivative of said ratio.

7. Process as in claim 1, comprising dynamically adjusting the trapping means to adjust the measuring cut-off diameter for setting and maintaining the cut-off diameter on a desired position on a curve representing a particle size distribution.

8. Apparatus for measuring characteristics of a particle flow, the apparatus comprising:
 a passage with an inlet and an outlet for guiding a sample flow comprising particles through the apparatus;
 means for electrically charging the particles;
 trapping means for trapping essentially all free ions and charged particles having particle diameter smaller than a trap cut-off diameter, the cut-off diameter being a particle diameter above which penetration through the trapping means essentially deviates from zero;
 means for measuring an electrical current carried by said charged particles that are not trapped; and
 control means for adjusting the trapping means to adjust the cut-off diameter based on measured electrical current carried by said charged particles that are not trapped,
 wherein the control means for adjusting the trapping means comprises means for adjusting the cut-off diameter to a reference cut-off diameter and to a measuring cut-off diameter resulting in a measured reference electrical current and a measured electrical current, respectively, carried by said charged particles that are not trapped, and wherein the means for adjusting the cut-off diameter is arranged to compare the measured reference electric current to the measured electric current, and to dynamically adjust the measuring cut-off diameter based on the comparison of the measured reference electrical current to the measured electrical current.

9. Apparatus as in claim 8, wherein the trapping means comprises a voltage trap and the control means is further arranged to adjust a trap voltage of the voltage trap to a reference voltage and to a measuring voltage resulting in the measured reference electrical current and the measured electrical current, respectively, carried by said charged particles that are not trapped, wherein the control means is further arranged to dynamically adjust the measuring voltage based on the comparison of the measured reference electrical current to the measured electrical current.

10. Apparatus as in claim 8, wherein the apparatus comprises first and second means for measuring the measured electrical current carried by said charged particles that are not trapped and first and second trapping means for trapping essentially all free ions and charged particles having a particle diameter smaller than a cut-off diameter, wherein the control means is further arranged to adjust the first trapping means to adjust a cut-off diameter of the first trapping means to the reference cut-off diameter resulting in the measured reference electrical current in the first means for measuring, and to adjust the second trapping means to adjust a cut-off diameter of the second trapping means to the measuring cut-off diameter resulting the measured electrical current in the second means for measuring, wherein said first trapping means and said first means for measuring are arranged in cascade or in parallel with said second trapping means and said second means for measuring.

11. Apparatus as in claim 8, wherein the trapping means comprise a diffusion trap, the control means is further arranged to adjust the sample flow to a diffusion trap to a reference flow and to a measuring flow resulting in the measured reference electrical current and the measured electrical current, respectively, carried by said charged particles that are not trapped, wherein the control means is further arranged to dynamically adjust the sample flow to a measuring flow based on the comparison of the measured reference electrical current to the measured electrical current.

12. Apparatus as in claim 11, wherein the control means is further arranged to adjust the sample flow and alternate the sample flow between a reference flow and at least one measuring flow resulting in the measured reference electrical current and at least one measured electrical current, respectively, carried by said charged particles that are not trapped.

13. Apparatus as in claim 8, wherein the control means is further arranged to dynamically adjust said measuring cut-off diameter based on a ratio of the measured reference electrical current and the measured electrical current in order to reach and maintain a desired level of said ratio.

14. Apparatus as in claim 13, wherein said desired level of said ratio is between 0.3 and 0.7.

15. Apparatus as in claim 13, wherein said control means is further arranged to occasionally deviate the measuring cut-off diameter from a level which results in said desired ratio, wherein the apparatus comprises means for estimating the particle size distribution based on derivative of said ratio with respect to the measuring cut-off diameter, or any transformation of that.

16. Apparatus as in claim 8, wherein the control means is further arranged to dynamically adjust the measuring cut-off diameter for setting and maintaining the cut-off diameter on a desired position on a curve representing a particle size distribution.

17. Apparatus as in claim 16, wherein said desired position of the cut-off diameter is at an inflexion point of a curve having the measured electrical current as a function of the particle size distribution.

18. Apparatus as in claim 16, wherein said desired position of the cut-off diameter is at an inflexion point of a curve having the measured electrical current as a function of the sample flow.

19. A process for measuring characteristics of a particle flow, comprising steps:
a) guiding a sample flow comprising particles through a passage;
b) electrically charging the particles;
c) trapping essentially all free ions and charged particles having a particle diameter smaller than a trap cut-off diameter, the cut-off diameter being a particle diameter above which penetration through the trapping means essentially deviates from zero;
d) measuring an electrical current carried by said charged particles that are not trapped;
e) adjusting the trapping means to adjust the cut-off diameter based on the measured electrical current carried by said charged particles that are not trapped;
f) adjusting the trapping means to adjust the cut-off diameter to a reference cut-off diameter and to a measuring cut-off diameter resulting in a measured reference electrical current and a measured electrical current, respectively, carried by said charged particles that are not trapped;
g) comparing the measured reference electric current to the measured electrical current;
h) dynamically adjusting the trapping means to adjust the measuring cut-off diameter based on the comparing of the measured reference electrical current to the measured electrical current; and
i) adjusting the trapping means to adjust the cut-off diameter and alternate the cut-off diameter between a reference cut-off diameter and at least one measuring cut-off diameter to result in the measured reference electrical current and at least one measured electrical current, respectively, carried by said charged particles that are not trapped.

20. Apparatus for measuring characteristics of a particle flow comprising:
a passage with an inlet and an outlet for guiding a sample flow comprising particles through the apparatus;
means for electrically charging the particles;
trapping means for trapping essentially all free ions and charged particles having a particle diameter smaller than a trap cut-off diameter, the cut-off diameter being the particle diameter above which penetration through the trapping means essentially deviates from zero;
means for measuring an electrical current carried by said charged particles that are not trapped; and
control means for adjusting the trapping means to adjust the cut-off diameter based on the measured electrical current carried by said charged particles that are not trapped, wherein the control means comprises means for adjusting the cut-off diameter to a reference cut-off diameter and to a measuring cut-off diameter resulting in a measured reference electrical current and a measured electrical current, respectively, carried by said charged particles that are not trapped, wherein the control means is further arranged to compare the measured reference electric current to the measured electric current, and to dynamically adjust the measuring cut-off diameter based on the comparison of the measured reference electrical current to the measured electrical current;

wherein the trapping means comprise a voltage trap and the control means is further arranged to adjust a trap voltage of the voltage trap to a reference voltage and to a measuring voltage resulting in the measured reference electrical current and the measured electrical current, respectively, carried by said charged particles that are not trapped, wherein the control means is further arranged to dynamically adjust the measuring voltage based on the measured reference electrical current and the measured electrical current;

wherein the control means is further arranged to adjust the trap voltage and alternate the trap voltage between a reference voltage and at least one measuring voltage resulting in the measured reference electrical current and at least one measured electrical current carried by said charged particles that are not trapped.

* * * * *